United States Patent
Baettig

(10) Patent No.: US 7,060,105 B2
(45) Date of Patent: Jun. 13, 2006

(54) COPPER COMPLEX MONAZO DYES AND THEIR PREPARATION AND USE

(75) Inventor: Kurt Baettig, Le Mouret (CH)

(73) Assignee: Ilford Imaging Switzerland GmbH (CH)

(*) Notice: Subject to any disclaimer, the term of this patent is extended or adjusted under 35 U.S.C. 154(b) by 127 days.

(21) Appl. No.: 10/671,811

(22) Filed: Sep. 26, 2003

(65) Prior Publication Data

US 2004/0068103 A1 Apr. 8, 2004

(30) Foreign Application Priority Data

Sep. 26, 2002 (EP) .................. 02405827

(51) Int. Cl.
- C14C 3/02 (2006.01)
- D06P 3/10 (2006.01)
- B41M 1/00 (2006.01)
- D21H 11/02 (2006.01)

(52) U.S. Cl. .................. 8/94.1; 8/147; 8/260; 8/400; 544/252.01; 544/252.1; 544/252.13; 544/252.16; 546/20; 546/233.32

(58) Field of Classification Search ................ 544/225; 106/31.51, 31.84; 534/693, 724
See application file for complete search history.

(56) References Cited

U.S. PATENT DOCUMENTS

| | | | |
|---|---|---|---|
| 3,853,840 A * | 12/1974 | Schundehutte et al. ..... 534/619 |
| 4,626,284 A | 12/1986 | Ohta et al. | |
| 4,703,113 A | 10/1987 | Baxter et al. | |
| 4,931,550 A * | 6/1990 | Quayle et al. ............. 534/724 |
| 4,939,243 A | 7/1990 | Meininger et al. | |
| 4,963,189 A | 10/1990 | Hindagolla | |
| 6,068,687 A | 5/2000 | Baettig et al. | |
| 6,521,032 B1 | 2/2003 | Lehmann et al. | |
| 2002/0017218 A1 | 2/2002 | Baettig et al. | |
| 2002/0121221 A1 | 9/2002 | Baettig | |

FOREIGN PATENT DOCUMENTS

| | | |
|---|---|---|
| EP | 247729 * | 6/1990 |
| EP | 0 425 150 A2 | 5/1991 |
| EP | 0 597 672 A2 | 5/1994 |
| EP | 0 755 984 A1 | 1/1997 |
| EP | 0 918 074 A1 | 5/1999 |
| EP | 1 160 291 A1 | 12/2000 |
| EP | 1 086 999 A2 | 3/2001 |
| EP | 2 219 682 A1 | 7/2002 |
| GB | 1372368 | 10/1974 |
| GB | 2289473 A | 11/1995 |
| JP | 63030573 | 2/1988 |
| JP | 2000265099 | 9/2000 |
| WO | WO 96/24636 | 8/1996 |

OTHER PUBLICATIONS

"Ozone Problem with Epson Photo Paper" Hardcopy Supplies Journal 6(7), 35-36 (2000).

* cited by examiner

Primary Examiner—Rita Desai
(74) Attorney, Agent, or Firm—Dara L. Onofrio, Esq.; Onofrio Law

(57) ABSTRACT

Copper complex monoazo dyes of general formula (V)

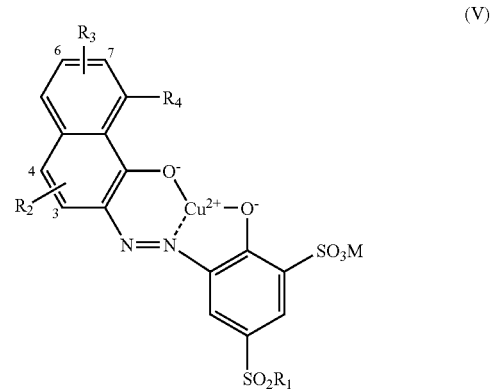

and of general formula (VI)

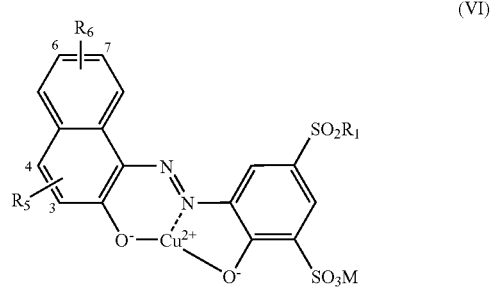

wherein $R_1$, $R_2$, $R_3$, $R_4$, $R_5$, $R_6$ and M are as described in the specification, are excellent magenta dyes for dyeing and printing of cellulose containing materials and textile materials and especially for the preparation of inks for ink jet printing.

10 Claims, No Drawings

COPPER COMPLEX MONAZO DYES AND THEIR PREPARATION AND USE

FIELD OF THE INVENTION

The invention relates to novel copper complex monoazo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are essentially of two types:

In continuous stream ink jet printing systems, ink is emitted in a continuous stream under pressure through a nozzle. The stream breaks up into individual droplets at a certain distance from the nozzle. If a specific location on the recording sheet has to be printed the individual droplets are directed to the recording sheet, otherwise they are directed to a collecting vessel. This is done for example by charging unnecessary droplets in accordance with digital data signals and passing them through an electrostatic field which adjusts the trajectory of these droplets in order to direct them to the collecting vessel. The inverse procedure may also be used wherein uncharged droplets end up in the collecting vessel.

In the non-continuous process, or the so-called "drop-on-demand" systems, droplets are generated in accordance with digital data signals only if a specific location on the recording sheet has to be printed.

The speed of ink jet printers of the newest generation is ever increasing for economic reasons. Recording sheets particularly suitable for these printers need to absorb the inks very rapidly. Recording sheets particularly suitable for this purpose comprise nanoporous inorganic compounds such as oxides or oxide/hydroxides.

Images produced in this way need to have excellent storage stability even under adverse climatic conditions. This can only be achieved by using a finely tuned system of inks (respectively the dyes contained therein) adapted to these nanoporous recording sheets.

Such recording sheets available today do not have all the properties required when printed with inks available today. In particular, the storage stability of images printed onto these recording sheets has to be improved. These images are not particularly stable even in the dark when they are in contact with ambient air, which normally contains impurities such as ozone or nitrogen oxides. The images are strongly altered or even destroyed in a short time when they are in contact with ambient air. These phenomena are described for example in "Ozone Problem with Epson Photo Paper", Hardcopy Supplies Journal 6 (7), 35–36 (2000).

Although quite a number of different copper complex monoazo dyes with magenta or red hue have already been proposed as dyes for ink jet printing, none meets all the necessary requirements. In particular, the storage stability in the dark of images containing these dyes when they are in contact with ambient air containing impurities is not sufficient.

The copper complex monoazo dye of formula (I) is described in patent application EP 1,086,999 (Example No. 19).

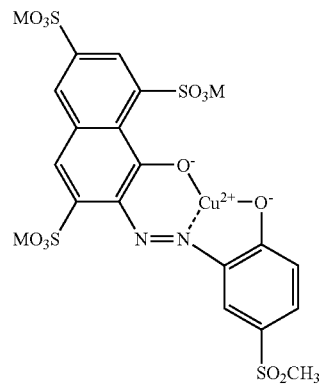

(I)

The copper complex monoazo dyes of formulas (II) and (III) are described in patent application JP 2000-265,099.

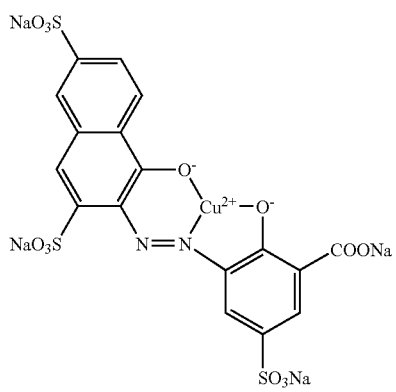

(II)

(III)

The copper complex monoazo dye of formula (IV) is described in patent application JP 63-30,573.

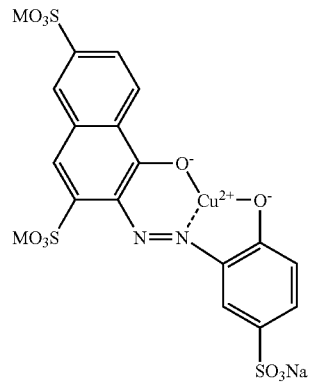

(IV)

All these copper complex monoazo dyes, representing the state of the art, do not satisfy all the required demands if they are used in the formulation of inks for ink jet printing that should provide magenta colorings on nanoporous recording sheets with particularly high brilliance and, at the same time, with improved storage stability in the dark of images containing these dyes when they are in contact with ambient air containing impurities. Furthermore, the diffusion fastness of these dyes under conditions of high humidity and temperature is not sufficient.

Dyes used for the preparation of such inks need to have a good solubility in the essentially aqueous ink liquid, they have to penetrate into the recording sheet and should not show dye aggregation on the surface of the recording sheet ("bronzing"). They need to provide printed images having high optical density, good water fastness, good light stability and good storage stability even under adverse conditions. They need to be stable in the ink even when the ink is stored for a long time under adverse conditions.

Various types of ink compositions have been proposed. Typical inks comprise one or more dyes or pigments, water, organic cosolvents and other additives.

The inks have to satisfy the following criteria:
(1) The ink gives images of excellent quality on any type of recording sheet.
(2) The ink gives printed images exhibiting good water fastness.
(3) The ink gives printed images exhibiting good light stability.
(4) The ink gives printed images exhibiting excellent smudge behavior.
(5) The ink gives printed images exhibiting excellent storage stability under conditions of high temperature and humidity.
(6) The ink does not clog jetting nozzles of the ink jet printers even when these are kept uncapped while recording is suspended for long periods.
(7) The ink may be stored for long periods of time without deterioration of its quality.
(8) The values of the physical properties of the inks, such as viscosity, conductivity and surface tension are all within defined ranges well suited for the intended use.
(9) The ink has to be non-toxic, non-flammable and safe.

SUMMARY OF THE INVENTION

Accordingly, an object of the invention is to provide novel copper complex monoazo dyes with red or magenta hue showing, at the same time, excellent light stability, water fastness, diffusion fastness and high solubility. They provide images or colorings showing good overall properties, in particular in ink jet printing, where they provide images on nanoporous recording sheets with improved storage stability in the dark when these are in contact with ambient air containing impurities. Furthermore, the sharpness of the images does not or only slightly deteriorate during long periods of storage under conditions of high temperature and humidity.

A further object of the invention is the provision of liquid dye preparations containing these dyes, in particular of inks for ink jet printing, showing a spectrally unchanged hue on any type of recording sheet such as plain or coated paper, coated or uncoated, opaque or transparent synthetic supports.

A further object of the invention is the provision of inks satisfying all the requirements mentioned above.

Other objects, features, and advantages of the present invention will become apparent from the following detailed description of the invention.

DETAILED DESCRIPTION OF THE INVENTION

The present invention relates to novel copper complex monoazo dyes of general formulas (V)

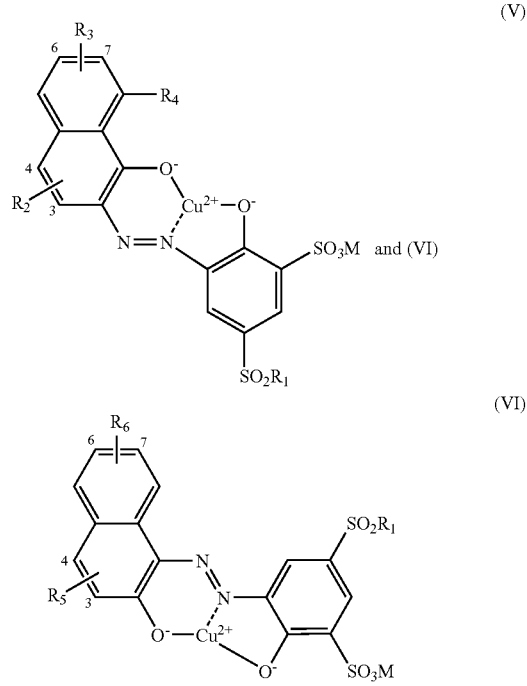

wherein
M represents hydrogen, a metal cation or an ammonium cation, which optionally may be substituted by one or more alkyl or substituted alkyl groups or alkyl ethers of diols each having from 1 to 18 C atoms;
$R_1$ represents alkyl having from 1 to 4 C atoms, substituted alkyl having from 2 to 4 C atoms, where the substituents are selected from the group consisting of hydroxy and sulfato; or alkenyl having from 2 to 4 C atoms;
$R_2$ represents hydrogen or $SO_3M$;
$R_3$ represents hydrogen, $SO_3M$, $NH_2$, $NHCOD_1$, where $D_1$ represents unsubstituted or substituted alkyl having from 1 to 6 C atoms, where the substituents are selected from the group consisting of carboxy, chloro or bromo; phenyl or substituted phenyl, where the substituents are selected from the group consisting of methyl, chloro, bromo, carboxy or sulfo; or $NHSO_2D_2$, where $D_2$ represents unsubstituted alkyl having from 1 to 6 C atoms, phenyl or substituted phenyl, where the substituents are selected from the group consisting of methyl, fluoro, chloro or bromo;
$R_4$ represents hydrogen, $SO_3M$, $NH_2$ or $NHSO_2D_3$, where $D_3$ represents alkyl having from 1 to 6 C atoms, phenyl or substituted phenyl where the substituents are selected from the group consisting of methyl, fluoro, chloro or bromo;

$R_5$ represents hydrogen, $SO_3M$, COOM or $COND_4D_5$, where $D_4$ and $D_5$ independently represent hydrogen, unsubstituted or substituted alkyl having from 1 to 6 C atoms, where the substituents are selected from the group consisting of methoxy, ethoxy, isopropoxy and hydroxy and $R_6$ represents hydrogen or $SO_3M$.

Preferred are copper complex monoazo dyes, where $R_2$, $R_3$, $R_4$, $R_5$ and $R_6$ are as defined above;

$R_1$ represents alkyl having from 1 to 4 C atoms and

M represents hydrogen, a metal cation or an ammonium cation, which optionally may be substituted by one or more alkyl or substituted alkyl groups or alkyl ethers of diols each having from 1 to 12 C atoms.

Also preferred are copper complex monoazo dyes, where M, $R_1$, $R_2$, $R_5$ and $R_6$ are as defined above and $R_3$, $R_4$ independently represent hydrogen or $SO_3$ M.

Especially preferred are copper complex monoazo dyes, where M, $R_1$, $R_2$, $R_3$, $R_4$ and $R_6$ are as defined above and $R_5$ represents hydrogen, $SO_3M$ or COOM.

Preferred as metal cations are the cations of the alkali metals (Li, Na, K, Rb and Cs) and of the alkaline earth metals (Mg, Ca, Sr and Ba).

Preferred as ammonium cations are unsubstituted ammonium, triethanolamine, diethanolamine, dimethylethanolamine, ethanolamine and 2,2-(ethylendioxy) diethylamine.

The prepared dyes of general formula (V) are listed in Table 1 together with the position of their absorption maximum in aqueous solution. M is Na and $R_2$ is sulfo for all dyes.

The compounds of general formulas (V) and (VI) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium such as tetramethylammonium or tetrabutylammonium.

The invention not only relates to pure copper complex monoazo dyes of general formulas (V) and (VI), but also to mixtures of these compounds.

The invention further claims a process for the preparation of the copper complex monoazo dyes of formulas (V) and (VI) according to the invention, wherein an aromatic amine of general formula (VII),

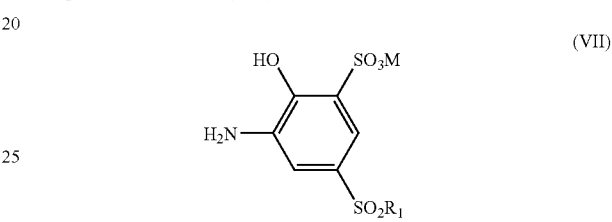

where $R_1$ and M are as defined above, is diazotized and subsequently coupled with a compound of formula (VIII)

TABLE 1

| Compound No. | $R_1$ | Position of $R_2$ | $R_3$/Position | $R_4$ | $\lambda_{max}$ in $H_2O$ (nm) |
|---|---|---|---|---|---|
| 10 | $CH_2CH_3$ | 3 | $SO_3M/6$ | H | 537 |
| 11 | $CH_2CH_3$ | 3 | H | $SO_3M$ | 538 |
| 12 | $CH_3$ | 3 | $SO_3M/6$ | H | 537 |
| 13 | $CH_3$ | 3 | $SO_3M/6$ | $SO_3M$ | 545 |
| 14 | $CH_3$ | 3 | H | $SO_3M$ | 538 |
| 15 | $CH_3$ | 4 | H | $SO_3M$ | 530 |
| 16 | $CH_3$ | 3 | $NHCO(CH_2)_2COOM/7$ | H | 538 |
| 17 | $CH_3$ | 3 | $SO_3M/6$ | $NHSO_2CH_3$ | 548 |
| 18 | $CH_3$ | 3 | $SO_3M/6$ | $H_3C$—⟨ ⟩—$SO_2HN$— | 551 |

The prepared dyes of general formula (VI) are listed in Table 2 together with the position of their absorption maximum in aqueous solution.

TABLE 2

| Compound No. | $R_1$ | $R_5$/Position | $R_6$/Position | M | $\lambda max$ in $H_2O$ (nm) |
|---|---|---|---|---|---|
| 100 | $CH_3$ | $SO_3M/3$ | $SO_3M/6$ | Na | 527 |
| 101 | $CH_3$ | COOM/3 | $SO_3M/6$ | Na | 525 |
| 102 | $CH_2CH_3$ | $SO_3M/3$ | $SO_3M/6$ | Na | 527 |
| 103 | $CH_2CH_3$ | $SO_3M/3$ | $SO_3M/6$ | $NH_4$ | 527 |
| 104 | $CH_3$ | $CON(CH_2CH_2OCH_3)_2/3$ | H | Na | 531 |
| 105 | $CH_3$ | $SO_3M/4$ | $NHCO(CH_2)_2COOM/6$ | Na | 544 |

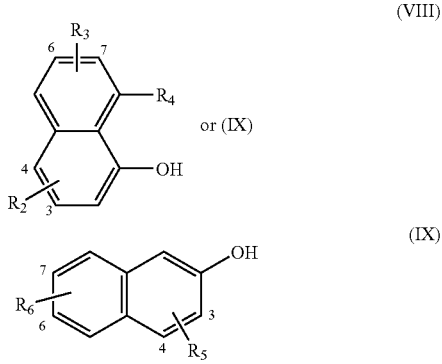

wherein $R_2$, $R_3$, $R_4$, $R_5$ and $R_6$ are as defined above, to form the intermediate metal free dye and the intermediate metal free dye obtained in this way is reacted with a coppering compound to form the copper complex dyes of general formulas (V) and (VI) according to the invention.

Process for recording text and images on recording sheets and for dying and printing natural or synthetic fiber materials, nanoporous materials, leather and aluminium by applying thereto a monoazo dye according to claim 1.

The copper complex monoazo dyes of general formulas (V) and (VI) are used to record text and images on recording sheets and for dying and printing natural or synthetic fiber materials, nanoporous materials, leather and aluminium by applying thereto the copper complex monoazo dye to provide dyed or printed materials with good water fastness and light stability.

All methods well known in the textile and paper industries for dyeing with substantive dyes may be used with the dyes, preferably for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one copper complex monoazo dye of general formulas (V) or (VI). The use of such liquid dye preparations is particularly preferred for paper dyeing. Such stable, liquid, preferably aqueous, concentrated dye preparations may be obtained by using methods well known in the art, preferably by dissolving in suitable solvents. The possibility of preparation of such stable, aqueous, concentrated preparations in the course of dye synthesis itself, without intermediate isolation of the dye, for example after a desalting step by diafiltration of the reaction solution, is of particular advantage.

Copper complex monoazo dyes or mixtures of copper complex monoazo dyes of general formulas (V) and (VI) are excellent dyes for the preparation of inks for ink jet printing.

The copper complex monoazo dyes of formulas (V) or (VI) according to the invention may be combined with other magenta dyes, in particular those described in patent applications WO 96/24,636, EP 0,755,984, EP 0,918,074, EP 1,160,291, EP 1,219,682 and in EP 1,367,098 A1.

A suitable ink comprises one or more of the compounds according to the invention in a liquid aqueous medium. The ink contains from 0.5% to 20% by weight, preferably from 0.5% to 8% by weight, of these compounds, based on the total weight of the ink. The liquid medium is preferably water or a mixture of water and water miscible organic solvents. Suitable solvents are given for example in U.S. Pat. No. 4,626,284, U.S. Pat. No. 4,703,113 and U.S. Pat. No. 4,963,189 and in patent applications GB 2,289,473, EP 0,425,150 and EP 0,597,672.

The present invention will be illustrated in more detail by the following examples without limiting the scope of the claimed compounds in any way.

EXAMPLES

Example 1

Compound No. 10 of Table 1 was prepared in the following way:

Dye Diazo Component:

The compound of formula (X)

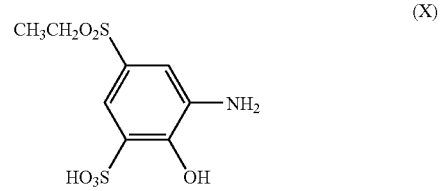

was prepared in the following way:

41.5 g (0.2 moles) of 2-amino-4-(ethylsulfonyl)phenol (Content 97%, available from Sigma-Aldrich, St. Louis, USA) were added under ice cooling in small portions to 100 ml of oleum (45%) in such a manner that temperature never exceeded 40° C. After the completion of the addition the reaction mixture was stirred for 18 hours at a temperature of 75° C. Afterwards the reaction mixture was poured onto ice, the precipitated product was suction filtered and purified by washing with water. 44.3 g of the compound of formula (X) were obtained after drying.

Suspension A:

9.4 g (30 mmoles) of the compound of formula (X) (Content 90%) were suspended in 40 ml of water and the value of pH was adjusted to 7.0 by the addition of an aqueous solution of sodium hydroxide (30%). The resulting solution was cooled down to a temperature between 0° C. and 5° C. and 7.5 ml of an aqueous solution of sodium nitrite (4 N) were added. 7.5 ml of an aqueous solution of hydrochloric acid (37%) were added within 5 minutes under stirring at a temperature of 0° C. to 10° C. Stirring was continued for 1 hour at this temperature. Finally, the excess of nitrous acid was removed by reaction with sulfaminic acid.

Preparation of dye No. 10

This cold suspension A was added within 30 minutes at an internal temperature of 5° C. to 10° C. to the suspension of 10.5 g (30 mmoles) of the disodium salt of 1-naphthole-3,6-disulfonic acid (available from Acros Organics, Geel, Belgium) in 50 ml of water while maintaining pH at a value from 7.0 to 8.0 by simultaneous addition of an aqueous solution of sodium hydroxide (30%). After the completion of the addition stirring was continued for 1 hour at a temperature from 5° C. to 20° C. and for a further 18 hours at room temperature.

Afterwards the suspension of the dye was heated to a temperature of 60° C., 6.0 g (30 mmoles) of copper(II)- acetate-monohydrate (available from Fluka Chemie AG, Buchs, Switzerland) were added in small portions under vigorous stirring while maintaining pH at a value from 7.0 to 8.0 by simultaneous addition of an aqueous solution of sodium hydroxide (30%). After the completion of the addition stirring was continued for 1 hour at a temperature of 60° C. and for a further 18 hours at room temperature.

The dye was salted out by addition of sodium chloride and the precipitate was filtered off. 14 g of dye No. 10 were obtained in this way.

In the last step of the synthesis, an amine such as ethanolamine, diethanolamine or ammonium hydroxide may be used in place of the aqueous solution of sodium hydroxide in order to keep pH at a constant value.

The copper complex monoazo dyes No. 11 to 18 and No. 100 to 105 according to the invention may be prepared in a similar way by using appropriate starting materials.

Example 2

Example of Ink Preparation

The present invention, as far as it relates to inks, is illustrated by the following examples using dyes according to the invention from Tables 1 and 2 and dyes representing the state of the art. Two different inks were prepared for each dye, one with 100% of dye and another one containing only 25% of dye. 100 g of each ink were prepared by heating the necessary amount of dye (0.5–5 g), glycerol (14 g), propylene glycol (14 g), Tergitol 15-S-7 (available from Union Carbide Co., Houston, USA) (0.5 g) and a biocide solution (Mergal K 10N, available from Riedel-de-Haën, Seelze, Germany) (0.2 g) together with water at a temperature of 50° C. under stirring for approximately 1 hour. The resulting solution was cooled down to a temperature of 20° C., its value of pH was adjusted to 7.5 and the solution was passed through a Millipore® filter of 0.5 μm pore diameter. The dye quantity was adjusted in such a way that the optical density of the printed image was similar for all dyes.

Examples of Ink Application

The inks were then printed onto the nanoporous recording sheets Epson Premium Glossy Photo Paper und Konica Photolike QP, Quick Dry with an ink jet printer Epson Stylus Photo 890®. Colored squares of 1 cm² containing a finely graded grid were printed, wherein the squares of this grid had a length of 8 pixels and the lines a width of 2 pixels. The printed samples were dried for 24 hours in air having a relative humidity of 59%.

Stability In Contact With Ambient Air

The optical density of the colored squares was measured using a Spectrolino™ spectrometer, available from Gretag Macbeth, Regensdorf, Switzerland. Afterwards the printed samples were stored for 7 or 14 days in the dark in a cabinet with circulating air at a temperature of 20° C. and a relative humidity of 50%. At the end of the storage period, the samples were remeasured. The density difference of these two measurements, expressed as per cent of the initial density, is an indication of the amount of dye loss that occurred in the dark when the samples were in contact with ambient air.

Results

The density losses, determined in this way, for the stability of the samples in the dark when they were in contact with ambient air for 7 days for the recording sheet Epson Premium Glossy Photo Paper are listed in Table 3 for the concentrated ink.

TABLE 3

| Dye | Optical Density before Storage | Optical Density after Storage | Density Difference in Percent |
|---|---|---|---|
| 13  | 1.64 | 1.43 | 12.8 |
| I   | 1.81 | 1.56 | 13.8 |
| 10  | 1.66 | 1.45 | 12.7 |
| II  | 1.72 | 1.36 | 20.9 |
| IV  | 1.82 | 0.98 | 42.4 |
| 102 | 1.72 | 1.46 | 7.0  |
| III | 1.49 | 1.31 | 12.1 |

The density losses, determined in this way, for the stability of the samples in the dark when they were in contact with ambient air for 7 days for the recording sheet Epson Premium Glossy Photo Paper are listed in Table 4 for the diluted ink.

TABLE 4

| Dye | Optical Density before Storage | Optical Density after Storage | Density Difference in Percent |
|---|---|---|---|
| 13  | 0.59 | 0.55 | 6.8  |
| I   | 0.68 | 0.58 | 14.7 |
| 10  | 0.59 | 0.54 | 8.5  |
| II  | 0.60 | 0.51 | 15.0 |
| IV  | 0.61 | 0.35 | 42.6 |
| 102 | 0.59 | 0.56 | 5.1  |
| III | 0.56 | 0.51 | 8.9  |

The density losses, determined in this way, for the for the stability of the samples in the dark when they were in contact with ambient air for 14 days for the recording sheet Konica Photolike QP, Quick Dry Photo Paper are listed in Table 5 for the concentrated ink.

TABLE 5

| Dye | Optical Density before Storage | Optical Density after Storage | Density Difference in Percent |
|---|---|---|---|
| 13  | 1.57 | 1.37 | 12.7 |
| I   | 1.75 | 1.48 | 15.4 |
| 10  | 1.64 | 1.43 | 12.8 |
| II  | 1.73 | 1.43 | 17.3 |
| IV  | 1.65 | 0.94 | 43.0 |
| 102 | 1.53 | 1.43 | 6.5  |
| III | 1.54 | 1.41 | 8.4  |

The density losses, determined in this way, for the stability of the samples in the dark when they were in contact with ambient air for 7 days for the recording sheet Konica Photolike QP, Quick Dry Photo Paper are listed in Table 6 for the diluted ink.

TABLE 6

| Dye | Optical Density before Storage | Optical Density after Storage | Density Difference in Percent |
|---|---|---|---|
| 13  | 0.59 | 0.53 | 10.2 |
| I   | 0.67 | 0.57 | 14.9 |
| 10  | 0.58 | 0.52 | 10.3 |
| II  | 0.64 | 0.56 | 12.5 |
| IV  | 0.62 | 0.33 | 46.8 |
| 102 | 0.61 | 0.58 | 4.9  |
| III | 0.59 | 0.53 | 10.2 |

The amounts of dye loss determined in this way in Tables 3, 4, 5 and 6 immediately show that the concentrated and the diluted inks containing the copper complex monoazo dye No. 10 according to the invention have a considerably increased stability in the dark in contact with ambient air in comparison to the known copper complex monoazo dyes II and IV having a similar structure.

The amounts of dye loss determined in this way in Tables 3, 4, 5 and 6 immediately show that the concentrated and the diluted inks containing the copper complex monoazo dye No. 13 according to the invention have a considerably increased stability in the dark in contact with ambient air in comparison to the known copper complex monoazo dye I having a similar structure.

The amounts of dye loss determined in this way in Tables 3, 4, 5 and 6 immediately show that the concentrated and the diluted inks containing the copper complex monoazo dye No. 102 according to the invention have a considerably increased stability in the dark in contact with ambient air in comparison with the known copper complex monoazo dye III having a similar structure.

This means that images printed in an ink jet printer with an ink containing the copper complex monoazo dyes according to the invention show smaller amounts of dye loss even under adverse storage conditions when the images are exposed to ambient air containing impurities in comparison to images containing the known copper complex monoazo dyes.

Finally, variations from the examples given herein are possible in view of the above disclosure. Therefore, although the invention has been described with reference to certain preferred embodiments, it will be appreciated that other dyes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A compound of formulas (V)

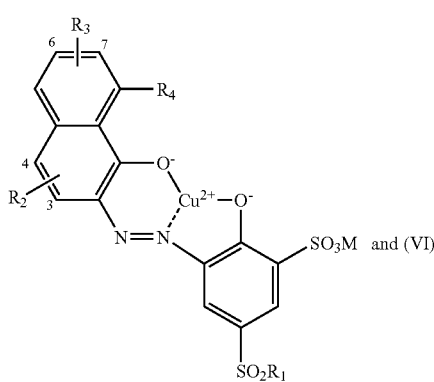

and (VI)

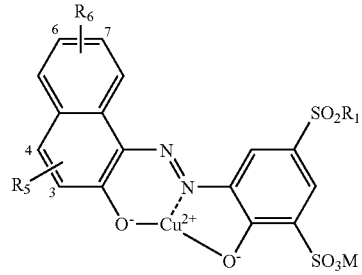

wherein
M represents hydrogen, a metal cation or an ammonium cation, which optionally may be substituted by one or more alkyl or substituted alkyl or hydroxyalkoxyalkyl groups each having from 1 to 18 C atoms;
$R_1$ represents alkyl having from 1 to 4 C atoms, substituted alkyl having from 2 to 4 C atoms, where the substituent is hydroxy;
$R_2$ represents hydrogen or $SO_3M$;
$R_3$ represents hydrogen, $SO_3M$, $NH_2$, $NHCOD_1$, where $D_1$ represents unsubstituted or substituted alkyl having from 1 to 6 C atoms, where the substituents are selected from the group consisting of carboxy, chloro or bromo; phenyl or substituted phenyl, where the substituents are selected from the group consisting of methyl, chloro, bromo, carboxy or sulfo; or $NHSO_2D_2$, where $D_2$ represents unsubstituted alkyl having from 1 to 6 C atoms, phenyl or substituted phenyl, where the substituents are selected from the group consisting of methyl, fluoro, chloro or bromo;
$R_4$ represents hydrogen, $SO_3M$, $NH_2$ or $NHSO_2D_3$, where $D_3$ represents alkyl having from 1 to 6 C atoms, phenyl or substituted phenyl where the substituents are selected from the group consisting of methyl, fluoro, chloro or bromo;
$R_5$ represents hydrogen, $SO_3M$, $COOM$ or $COND_4D_5$, where $D_4$ and $D_5$ independently represent hydrogen, unsubstituted or substituted alkyl having from 1 to 6 C atoms, where the substituents are selected from the group consisting of methoxy, ethoxy, isopropoxy and hydroxy
and
$R_6$ represents hydrogen or $SO_3M$.

2. The compound according to claim 1, wherein $R_2$, $R_3$, $R_4$, $R_5$, $R_6$ are as defined in claim 1;
$R_1$ represents alkyl having from 1 to 4 C atoms
and
M represents hydrogen, a metal cation or an ammonium cation, which optionally may be substituted by one or more alkyl or substituted alkyl or hydroxyalkoxyalkyl groups each having from 1 to 18 C atoms.

3. The compound according to claim 1, wherein $R_2$, $R_5$ and $R_6$ are as defined in claim 1;
$R_1$ represents alkyl having from 1 to 4 C atoms;
M represents hydrogen, a metal cation or an ammonium cation, which optionally may be substituted by one or more alkyl or substituted alkyl or hydroxyalkoxyalkyl groups each having from 1 to 18 C atoms;
and
$R_3$, $R_4$ independently represent hydrogen or $SO_3M$.

4. The compound according to claim 1, wherein $R_2$ and $R_6$ are as defined in claim 1;
 $R_1$ represents alkyl having from 1 to 4 C atoms;
 $R_3$, $R_4$ independently represent hydrogen or $SO_3M$;
 M represents hydrogen, a metal cation or an ammonium cation, which optionally may be substituted by one or more alkyl or substituted alkyl or hydroxyalkoxyalkyl groups each having from 1 to 18 C atoms;
and
 $R_5$ represents hydrogen, $SO_3M$ or COOM.

5. Process for the preparation of the compounds according to claim 1, wherein an aromatic amine of general formula (VII),

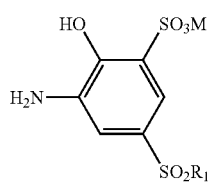

(VII)

where $R_1$ and M are as defined in claim 1, is diazotized and subsequently coupled with a compound of formula (VIII)

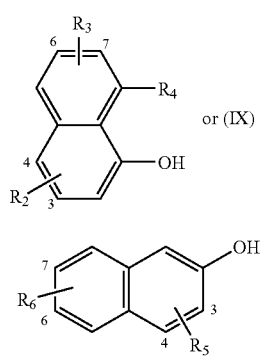

(VIII)

or (IX)

(IX)

wherein $R_2$, $R_3$, $R_4$, $R_5$ and $R_6$ are as defined in claim 1, to the intermediate metal free dye
and
 the intermediate metal free dye obtained in this way is reacted with a coppering compound to form the compounds of formulas (V) and (VI).

6. Process for recording text and images on materials selected from the group consisting of natural or synthetic fiber materials, nanoporous materials, leather and aluminium; by applying thereto, with an ink jet printer, a compound of formulas (V)

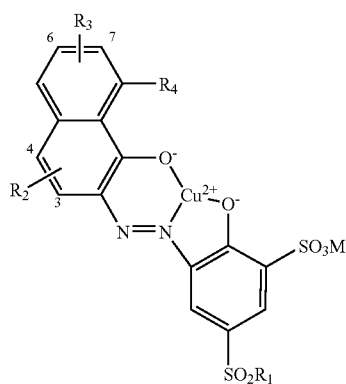

(V)

and (VI)

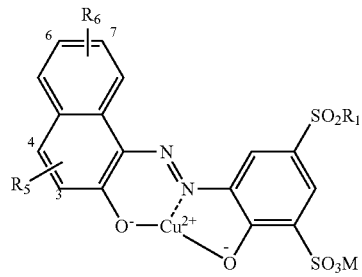

(VI)

wherein
 M represents hydrogen, a metal cation or an ammonium cation, which optionally may be substituted by one or more alkyl or substituted alkyl or hydroxyalkoxyalkyl groups each having from 1 to 18 C atoms;
 $R_1$ represents alkyl having from 1 to 4 C atoms, substituted alkyl having from 2 to 4 C atoms, where the substituent is hydroxy;
 $R_2$ represents hydrogen or $SO_3M$;
 $R_3$ represents hydrogen, $SO_3M$, $NH_2$, $NHCOD_1$, where $D_1$ represents unsubstituted or substituted alkyl having from 1 to 6 C atoms, where the substituents are selected from the group consisting of carboxy, chloro or bromo: phenyl or substituted phenyl, where the substituents are selected from the group consisting of methyl, chloro, bromo, carboxy or sulfo; or $NHSO_2D_2$, wherein $D_2$ represents unsubstituted alkyl having from 1 to 6 C atoms, phenyl or substituted phenyl, where the substituents are selected from the group consisting of methyl, fluoro, chloro or bromo;
 $R_4$ represents hydrogen, $SO_3M$, $NH_2$ or $NHSO_2D_3$, where $D_3$ represents alkyl having from 1 to 6 C atoms, phenyl or substituted phenyl where the substituents are selected from the group consisting of methyl, fluoro, chloro or bromo;
 $R_5$ represents hydrogen, $SO_3M$, COOM or $COND_4D_5$, where $D_4$ and $D_5$ independently represent hydrogen, unsubstituted or substituted alkyl having from 1 to 6 C atoms, where the substituents are selected from the group consisting of methoxy, ethoxy, isopropoxy and hydroxy
and
 represents hydrogen or $SO_3M$.

7. Liquid dye preparations comprising at least one compound or a mixture of compounds according to claim 1.

8. An ink composition for ink jet printing, comprising at least one compound or a mixture of compounds according to claim 1.

9. An ink composition for ink jet printing according to claim 8, comprising in addition one or more other dyes.

10. Process for dying and printing materials selected from the group consisting of natural or synthetic fiber materials, nanoporous materials, leather and aluminium; which comprises applying to said material a compound of formulas (V)

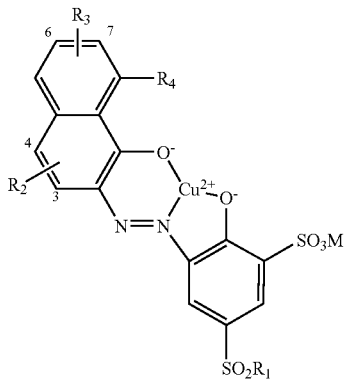

(V)

and (VI)

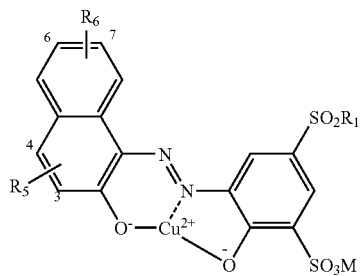

(VI)

wherein

M represents hydrogen, a metal cation or an ammonium cation, which optionally may be substituted by one or more alkyl or substituted alkyl or hydroxyalkoxyalkyl groups each having from 1 to 18 C atoms;

$R_1$ represents alkyl having from 1 to 4 C atoms, substituted alkyl having from 2 to 4 C atoms, where the substituent is hydroxy;

$R_2$ represents hydrogen or $SO_3M$;

$R_3$ represents hydrogen, $SO_3M$, $NH_2$, $NHCOD_1$, where $D_1$ represents unsubstituted or substituted alkyl having from 1 to 6 C atoms, where the substituents are selected from the group consisting of carboxy, chloro or bromo; phenyl or substituted phenyl, where the substituents are selected from the group consisting of methyl, chloro, bromo, carboxy or sulfo; or $NHSO_2D_2$, where $D_2$ represents unsubstituted alkyl having from 1 to 6 C atoms, phenyl or substituted phenyl, where the substituents are selected from the group consisting of methyl, fluoro, chloro or bromo;

$R_4$ represents hydrogen, $SO_3M$, $NH_2$ or $NHSO_2D_3$, where $D_3$ represents alkyl having from 1 to 6 C atoms, phenyl or substituted phenyl where the substituents are selected from the group consisting of methyl, fluoro, chloro or bromo;

$R_5$ represents hydrogen, $SO_3M$, COOM or $COND_4D_5$, where $D_4$ and $D_5$ independently represent hydrogen, unsubstituted or substituted alkyl having from 1 to 6 C atoms, where the substituents are selected from the group consisting of methoxy, ethoxy, isopropoxy and hydroxy and $R_6$ represents hydrogen or $SO_3M$.

* * * * *